April 18, 1967   R. W. HANNAY   3,315,200
STRAIN GAUGES
Filed Nov. 19, 1964
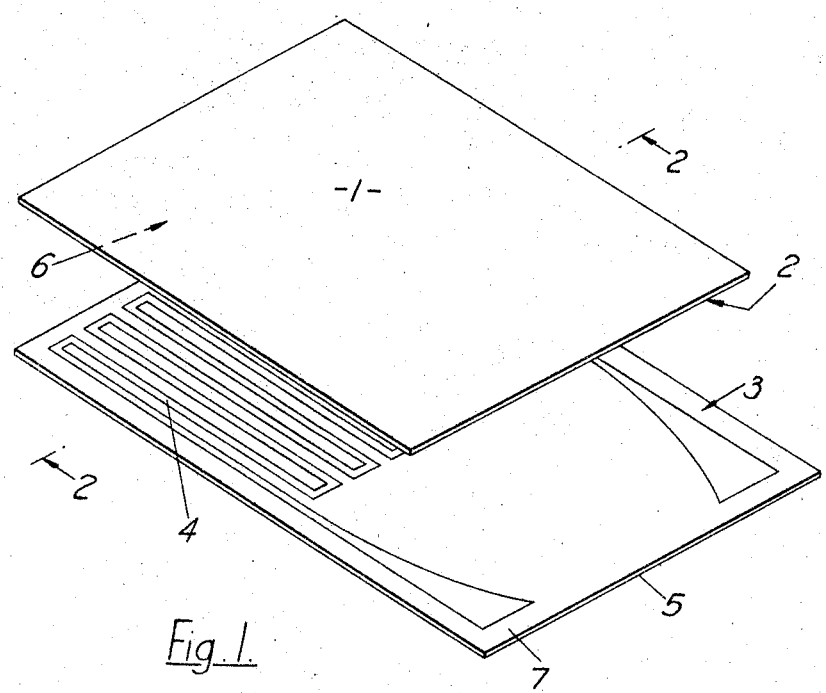
Fig.1.
Fig.2.
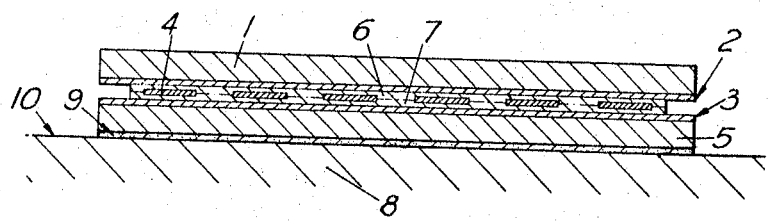
Inventor
RICHARD WILLIAM HANNAY
By Bailey, Stephens
& Huettig
Attorneys

United States Patent Office 3,315,200
Patented Apr. 18, 1967

3,315,200
STRAIN GAUGES
Richard William Hannay, Downend, Bristol, England, assignor to British Aircraft Corporation (Operating) Limited, London, England, a British company
Filed Nov. 19, 1964, Ser. No. 412,477
Claims priority, application Great Britain, Nov. 20, 1963, 45,822/63
1 Claim. (Cl. 338—2)

Often measurements have to be taken of properties of surfaces that involve the attachment of a transducer to the surface. It is convenient, therefore, if a transducer can be provided in a transducer unit complete with means for its ready attachment to a surface and means supplying all the necessary features enabling accurate measurements to be taken. Examples of such features are electrical insulation of the element from the surface, ability of the unit to withstand high temperatures, minimum thermal resistance between the element and the surface, and minimum thermal inertia of the unit as a whole.

According to the present invention a transducer unit comprises a transducing element of electrically conducting material mounted by means of adhesive to lie between the adjacent surfaces of two metal foils, each surface having an electrically non-conducting film.

A unit having such a construction is of particular use when strain is required to be measured. In such a case, the transducing element is of the type for measuring strain and the adhesive is capable of transmitting strain.

Preferably the element is a metal foil. By the term foil is understood the form of an object having insignificant depth in comparison with its width or length even though they are obviously finite, for example a pencil line. An element of such a form is very sensitive, can be made very small, and can, therefore, take very localised measurements.

Preferably the element is of cupronickel and is of the printed circuit type. Cupronickel alloys are particularly suitable for measuring strain in the temperature range −40° to 200° C.; cupronickel alloys having particular compositions are easily and accurately produced, so that a particular composition necessary for reasons explained later is readily produced.

A printed circuit may be produced in several ways. One entails coating a foil of metal, of suitable thickness, which is mounted by weak adhesive on a backing of plastic sheet, with a light sensitive coating, masking the portion corresponding to the area of the foil not required in the form of the element, then exposing the remainder to light. The exposed portion of the coating becomes insoluble in water; subsequent washing removes the soluble portion, and the exposed metal is etched away; the remaining portion of the foil therefore corresponds to the element. The insoluble coating is then removed. The non-conducting films on the two metal foils between which the element is to be sandwiched are coated with adhesive. The element is then pressed onto one of the adhesive coatings, its backing is stripped off, and finally the coatings on the two metal foils are pressed together to enclose the element.

In some embodiments of this invention the adhesive is preferably of the metal-dust filled resin type, such an adhesive has a higher thermal conductivity than a basic resin.

It is preferable in some applications to have had the transducer assembled under substantial pressure to make the thickness of the adhesive very small e.g. 0.00025 inch on each side of the element. In consequence the unit has less bulk, and the conductivity of heat between the surface and the element is improved.

Preferably at least one of the metal foils is of aluminium. This metal is readily available in foil form, has a high thermal conductivity, is light and transmits strain satisfactorily. A foil thickness of about 0.0005 inch has been found to have the necessary rigidity combined with suitable flexibility for strain transmission and thinness for good thermal conductivity.

A preferable material for a non-conducting film is aluminium oxide, since this is hard and permits pressure to be applied during assembly of the unit for the reasons explained above. A suitable thickness for this film has been found to be 0.0002 inch; considering ease of production with the hardness and degree of insulation necessary. Such a thickness of oxide is preferably commercially produced by anodic oxidation of the aluminium foil, but it is possible to achieve an oxide film of sufficient thickness by a vacuum deposition method.

It is particularly convenient, in the case of a strain gauge embodiment of the invention, if it is mounted on a surface of such material that it performs as a "selected melt" strain gauge. That is, the material of the gauge element is chosen such that when the element is totally and firmly attached to the particular surface, the change in resistance which is caused by the change in temperature of the element is substantially counteracted by the change in its resistance due to the change in its physical dimensions. Clearly the factors involved are the temperature coefficient of resistance of the element material, and the temperature coefficients of expansion of the materials of the element and of the surface. A further consideration is that, since these factors do not vary linearly with temperature for any materials, the materials have to be chosen to give optimum compensation for the particular temperature range required.

Preferably the transducer unit is further provided with an adhesive coating for attaching it to an independent surface. This adhesive may be of the synthetic resin type, and would have to be satisfactory in strain-transmissive properties over the working temperature range of the transducer unit. It is provided on the unit in semi-cured form, and preferably has a pressure-sensitive characteristic. Protection of the adhesive pre-coating during storage of the unit may be effected by a "strip-off" paper, or by plastic film backing. This pre-coating is conveniently applied during manufacture and greatly facilitates attachment.

Alternatively the unit may be attached by soldering, using a special flux in the case of aluminium. This leaves the thermal conductivity of the unit unimpaired and reduces the time to fix the unit to the surface. The time to fix an adhesive gauge is extended by the time to cure the adhesive used (e.g. 30 minutes) but the soldering operation would take only about 30 seconds.

It is considered that a transducer unit constructed according to the invention would have a performance when exposed to radiant heating under transient heating conditions, with rates as high as 6 degrees centigrade per second, insignificantly different from that under steady state heating conditions.

One embodiment of the invention, a strain gauge, is now described with reference to the accompanying drawings in which:

FIGURE 1 is a perspective view of a strain gauge prior to assembly.

FIGURE 2 is a section through the strain gauge taken on the line 2—2 in FIGURE 1.

An element 4 is shown sandwiched between two adhesive coatings 6 and 7 on the oxide films 2 and 3 respectively, which are on the metal foils 1 and 5, respectively. The unit is mounted by means of an adhesive or solder 9 to the surface 10 of a component 8.

I claim:

A strain transducing unit for attachment by an adhesive to a member having a high fluctuating temperature, the unit comprising, in superjacent sequence, the following parts: a first aluminum foil, a first electrically insulating aluminum oxide coating, then, in substantially coplanar relationship, a cupronickel strain transducer element and portions of a resin thereon, a second electrically insulating aluminum oxide coating, and a second aluminum foil, said aluminum foils having a thickness of about 0.0005 inch, said aluminum oxide films having a thickness of about 0.0002 inch, and on the outside of one of said aluminum foils a layer of adhesive for attachment to a test specimen.

References Cited by the Examiner
UNITED STATES PATENTS

| | | | |
|---|---|---|---|
| 2,360,267 | 10/1944 | Osterheld | 338—244 |
| 2,363,181 | 11/1944 | Howland | 338—2 |
| 2,486,822 | 11/1949 | Cameron | 165—171 X |
| 2,492,215 | 12/1949 | Osterheld | 219—376 |
| 2,613,306 | 10/1952 | Waltersdorf et al. | 219—345 |
| 2,662,957 | 12/1953 | Eisler | 338—255 X |
| 2,799,793 | 7/1957 | De Cain | 165—180 X |
| 2,837,619 | 6/1958 | Stein | 338—2 |
| 2,971,073 | 2/1961 | Eisler | 338—212 X |
| 3,031,739 | 5/1962 | Boggs | 219—345 X |
| 3,036,458 | 5/1962 | Vali. | |
| 3,105,139 | 9/1963 | Russell | 338—2 X |
| 3,153,140 | 10/1964 | Theodore et al. | 219—345 X |
| 3,274,528 | 9/1966 | Bermann | 338—2 |

RICHARD M. WOOD, *Primary Examiner.*

W. D. BROOKS, *Assistant Examiner.*